(12) United States Patent
Leao et al.

(10) Patent No.: US 9,511,434 B2
(45) Date of Patent: Dec. 6, 2016

(54) ELECTRICAL DISCHARGE MACHINING

(75) Inventors: Fabio Nogueira Leao, Nottingham (GB); Alexander Xidacis, Derby (GB); Martyn Cuttell, Derby (GB)

(73) Assignee: ROLLS-ROYCE PLC, London (GB)

( * ) Notice: Subject to any disclaimer, the term of this patent is extended or adjusted under 35 U.S.C. 154(b) by 828 days.

(21) Appl. No.: 13/991,231

(22) PCT Filed: Sep. 27, 2011

(86) PCT No.: PCT/EP2011/066715
§ 371 (c)(1),
(2), (4) Date: Jun. 3, 2013

(87) PCT Pub. No.: WO2012/072304
PCT Pub. Date: Jun. 7, 2012

(65) Prior Publication Data
US 2013/0248495 A1    Sep. 26, 2013

(30) Foreign Application Priority Data

Dec. 2, 2010 (GB) .................................. 1020401.4

(51) Int. Cl.
*B23H 1/08* (2006.01)
*B23H 1/10* (2006.01)
*B23H 7/26* (2006.01)
(Continued)

(52) U.S. Cl.
CPC ........ *B23H 1/08* (2013.01); *B23H 1/10* (2013.01); *B23H 7/26* (2013.01); *B23H 7/30* (2013.01); *B23H 7/38* (2013.01)

(58) Field of Classification Search
CPC ............ B23H 1/10; B23H 1/04; B23H 7/30; B23H 7/32; B23H 7/36; B23H 7/38

USPC ......... 219/69.11, 69.14, 69.15, 69.17, 69.16, 219/69.2
See application file for complete search history.

(56) References Cited

U.S. PATENT DOCUMENTS 3,887,782 A     6/1975  Wohlabaugh
RE28,734 E *   3/1976  Inoue .................... B23H 1/024
                                                  219/69.13

(Continued)

FOREIGN PATENT DOCUMENTS

CN    101883655 A       11/2010
DE    30 32 604 A1       3/1981

(Continued)

OTHER PUBLICATIONS

British Search Report issued in Application No. 1020401.4; Dated Dec. 16, 2010.

(Continued)

*Primary Examiner* — Sean Michalski
(74) *Attorney, Agent, or Firm* — Oliff PLC

(57) ABSTRACT

A method for electrical discharge machining a workpiece includes the steps of: presenting an elongate electrode to the workpiece with a spark gap therebetween; flowing a dielectric fluid in the gap; eroding the workpiece by electrical discharge between the tip of the electrode and the workpiece; displacing the electrode in a direction aligned with the long axis of the electrode to maintain the gap as the electrode wears and the workpiece is eroded; and simultaneously with the displacement, producing vibratory movement of the electrode, the vibratory movement being aligned with the long axis of the electrode.

16 Claims, 11 Drawing Sheets

(51) Int. Cl.
    *B23H 7/30*     (2006.01)
    *B23H 7/38*     (2006.01)

(56) References Cited

U.S. PATENT DOCUMENTS

| | | | | |
|---|---|---|---|---|
| 4,365,133 A * | 12/1982 | Inoue | ................ | B23H 1/00 |
| | | | | 219/69.13 |
| 4,393,292 A | 7/1983 | Inoue | | |
| 4,484,051 A * | 11/1984 | Yamada | ................ | B23H 1/02 |
| | | | | 219/69.13 |
| 6,373,018 B1 * | 4/2002 | Wei | ................ | B23H 7/26 |
| | | | | 219/69.11 |
| 6,384,364 B1 * | 5/2002 | Wei | ................ | B23H 9/14 |
| | | | | 219/69.17 |
| 6,627,054 B2 * | 9/2003 | Wei | ................ | B23H 9/16 |
| | | | | 204/224 M |
| 6,700,088 B1 * | 3/2004 | Loynes | ................ | B23H 7/265 |
| | | | | 219/69.15 |
| 6,979,795 B1 * | 12/2005 | Kaneko | ................ | B23H 7/18 |
| | | | | 219/69.16 |
| 6,998,562 B2 * | 2/2006 | Arakawa | ................ | B23H 7/04 |
| | | | | 219/69.12 |
| 7,078,645 B2 * | 7/2006 | Yamada | ................ | B23H 7/101 |
| | | | | 219/69.12 |
| 9,393,632 B2 * | 7/2016 | Rudgley | ................ | B23H 1/10 |
| 2001/0007319 A1 * | 7/2001 | Moro | ................ | B23H 7/101 |
| | | | | 219/69.12 |
| 2004/0122459 A1 * | 6/2004 | Harp | ................ | A61B 1/00165 |
| | | | | 606/171 |
| 2004/0262266 A1 * | 12/2004 | Ishiwata | ................ | B23H 1/10 |
| | | | | 219/69.2 |
| 2005/0218089 A1 * | 10/2005 | Wei | ................ | B23H 1/10 |
| | | | | 210/805 |
| 2006/0108328 A1 * | 5/2006 | Luo | ................ | B23H 1/02 |
| | | | | 219/69.13 |
| 2006/0131184 A1 | 6/2006 | Mielke | | |
| 2007/0289925 A1 * | 12/2007 | Kawarai | ................ | B01J 47/14 |
| | | | | 210/681 |
| 2009/0111723 A1 * | 4/2009 | Shibata | ................ | B23H 1/08 |
| | | | | 508/463 |
| 2009/0152244 A1 * | 6/2009 | Kita | ................ | B23H 1/10 |
| | | | | 219/69.19 |
| 2010/0051588 A1 * | 3/2010 | Li | ................ | B23H 7/20 |
| | | | | 219/69.17 |
| 2010/0163427 A1 * | 7/2010 | Zhan | ................ | B23H 1/00 |
| | | | | 205/651 |
| 2010/0243612 A1 * | 9/2010 | Leao | ................ | B23H 1/028 |
| | | | | 219/69.17 |
| 2011/0194945 A1 * | 8/2011 | Kensy | ................ | A61B 17/3203 |
| | | | | 417/26 |
| 2013/0248495 A1 * | 9/2013 | Leao | ................ | B23H 1/10 |
| | | | | 219/69.17 |
| 2015/0321277 A1 * | 11/2015 | Regenass | ................ | H01B 3/22 |
| | | | | 219/69.14 |
| 2015/0336193 A1 * | 11/2015 | Katougi | ................ | B23H 7/36 |
| | | | | 210/807 |
| 2015/0360310 A1 * | 12/2015 | Tee | ................ | B23H 1/022 |
| | | | | 219/69.16 |
| 2016/0039028 A1 * | 2/2016 | Nakajima | ................ | B23H 1/04 |
| | | | | 219/69.11 |

FOREIGN PATENT DOCUMENTS

| | | |
|---|---|---|
| FR | 2 465 551 A1 | 3/1981 |
| GB | 819267 A | 9/1959 |
| GB | 940264 A | 11/1959 |
| GB | 856983 A | 12/1960 |
| GB | 2 085 788 A | 5/1982 |
| JP | A-61-121824 | 6/1986 |
| JP | A-2006-272484 | 10/2006 |
| WO | WO 2009/071865 A1 | 6/2009 |

OTHER PUBLICATIONS

Written Opinion of the International Searching Authority Issued in Application No. PCT/EP2011/066715; Dated Dec. 14, 2011.
International Search Report issued in Application No. PCT/EP2011/066715; Dated Dec. 14, 2011.
Jan. 28, 2015 Office Action issued in Chinese Patent Application No. 201180066721.7.

* cited by examiner

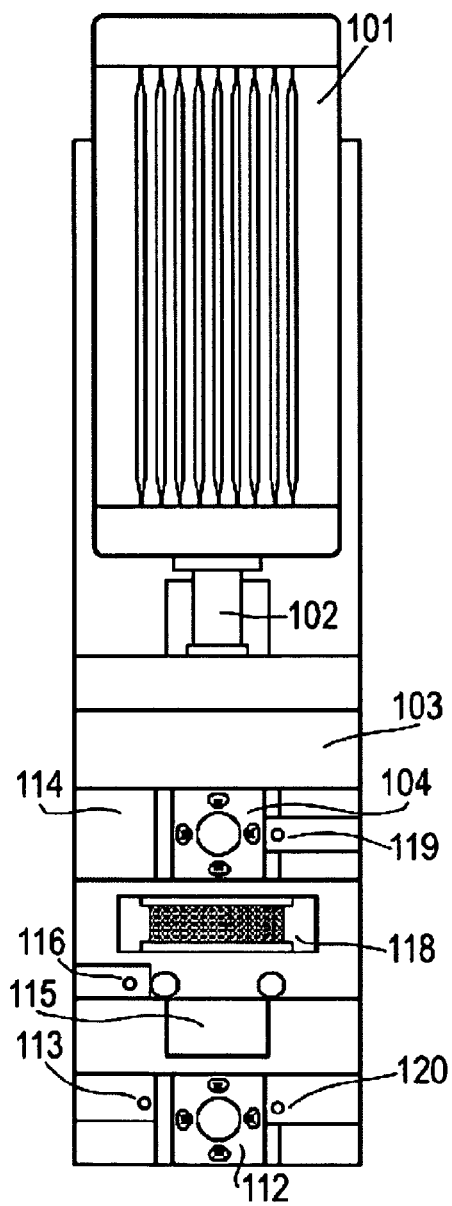
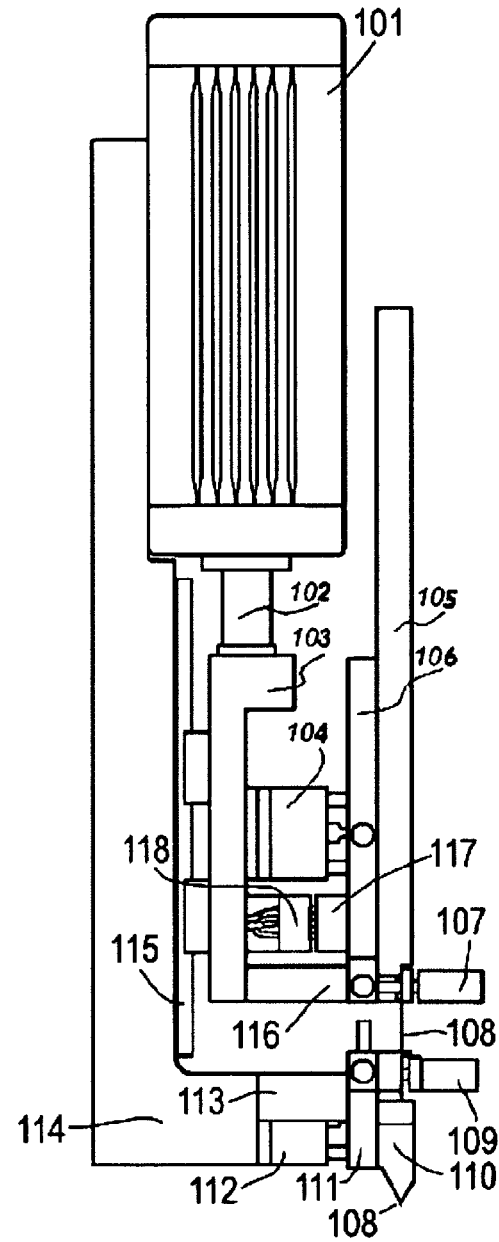

ELECTRICAL DISCHARGE MACHINING

FIELD OF THE INVENTION

The present invention relates to electrical discharge machining (EDM) and more particularly, but not exclusively, to so-called high speed electrical discharge machining (HSEDM) utilised for forming holes in components such as blades for gas turbine engines.

BACKGROUND OF THE INVENTION

EDM is utilised with regard to processing of workpieces by spark erosion. The workpiece and the electrode (usually made from graphite, copper or brass) are generally presented with a dielectric fluid between them and are connected to a DC power supply (EDM generator) delivering periodic pulses of electric energy, such that sparks erode the workpiece by melting and vaporisation and so create a cavity or hole or otherwise shape a workpiece. In order to provide for spark erosion, the workpiece and the electrode must have no physical contact and a gap is maintained typically through appropriate sensors and servo motor control. Erosion debris must be removed from the erosion site and this usually necessitates a retraction cycle during conventional electrical discharge machining. It is possible to utilise multiple electrodes in a single tool holder to allow several erosion and machining processes to be performed at the same time and normally side by side.

In HSEDM a high pressure (e.g. 70 to 100 bar) dielectric fluid pump is utilised in order to supply dielectric fluid to the gap between the workpiece and the electrode. As a result of the high pressure presentation of the dielectric fluid, the process is more efficient than conventional EDM, allowing more rapid removal of debris such that erosion rates are far greater. With HSEDM there is no need for retraction cycles between stages of erosion for evacuation of debris, as the high pressure flow of dielectric fluid in the gap between the workpiece and the electrode is more efficient for the removal of debris produced by the erosion process. Thus generally the electrode is simply fed forwards at a speed necessary to achieve the desired rate of material erosion and removal in accordance with the machining process. Continuous operation results in a significantly-faster machining process.

In the attached drawings, FIG. 1 schematically illustrates a typical HSEDM arrangement for the drilling of holes. The arrangement 1 comprises an electrode holder 2 which presents an elongate electrode 3 to a workpiece 4. Electrical discharge from the tip of the electrode is provided through a direct current electrical power generator 5 such that a cavity or hole is drilled, formed or machined into the workpiece. Dielectric fluid is supplied at a relatively high pressure (70 to 100 bar) to the cavity or hole defined progressively by a spark gap between the electrode and the workpiece. This high pressure dielectric flow is achieved through a pump 6 which acts on a dielectric fluid supply 7 to force the fluid under pressure as indicated into the gap between the electrode and the workpiece. The high pressure flushes and removes debris caused by the discharge process. A servo motor 8 or other device forces continuous movement of the electrode in the length direction of the electrode, driving the electrode into the workpiece. By monitoring the gap voltage, the servo motor can maintain a gap of constant size. Due to the high pressure dielectric fluid flow, there is rapid removal of debris and therefore generally it is not necessary to have a retraction cycle of the electrode in order to allow flushing as with conventional EDM. Thus, in the normal course of events, the servo motor simply moves the electrode down at the speed necessary to keep up with a desired rate of material removal and/or erosion. The constant motion produced by the servo motor allows for rapid drilling, but if drilling is too rapid there is an increased likelihood of short circuiting. In such circumstances, the servo motor retracts the electrode to allow clearing of the electrical short circuits and debris, and then reintroduces the electrode to reestablish the correct gap size for erosion.

HSEDM is used for drilling cooling holes and other features in turbine blades for gas turbine engines. Components such as turbine blades have very strict requirements with regard to hole geometry and surface integrity which can be met by HSEDM. However, HSEDM has high production costs and can lead to large variations in typical breakthrough time to form a hole. Also electrode wear necessitating re-working of components can be a problem. For example, it is not uncommon to have relative electrode wear factors which are greater than 100%, i.e. a greater length of electrode can be worn away than the depth of drilled hole. Electrode wear can also lead to tapering of the electrode, as illustrated in FIG. 2(a), and uneven wear in banks of electrodes, as illustrated in FIG. 2(b). Electrodes that become tapered produce tapered holes, with a restriction at an exit end. Uneven electrodes in a multiple electrode tool result in some electrodes not fully penetrating the workpiece to leave blocked holes. Alternatively, if the servo motor needs to feed the electrodes deeper to complete the hole formation, the excess electrode length in some of the electrodes can lead to backwall impingement erosion and so damage other parts of the component. Such backwall impingement erosion is illustrated in FIG. 3, in which the drilled through-hole 21 in turbine blade 22 continues in the drilling direction 20 into a backwall as unplanned cavity 23. Thus skilled operation of the HSEDM process can be essential.

WO 2009/071865 proposes an improved HSDEM process in which ultrasonic cavitation is induced within the pressurised dielectric fluid flow to enhance debris removal and thereby improve continuous machining.

SUMMARY OF THE INVENTION

However, there is a need for further improvements in electrical discharge machining processes.

Accordingly, a first aspect of the present invention provides a method for electrical discharge machining a workpiece including the steps of:
presenting an elongate electrode to the workpiece with a spark gap therebetween,
flowing a dielectric fluid in the gap,
eroding the workpiece by electrical discharge between the tip of the electrode and the workpiece,
displacing the electrode in a direction aligned with the long axis of the electrode to maintain the gap as the electrode wears and the workpiece is eroded, and
simultaneously with the displacement, producing vibratory movement of the electrode, the vibratory movement being aligned with the long axis of the electrode.

Advantageously, the vibratory movement of the electrode can induce corresponding vibrations in the dielectric fluid, which cause the fluid to form pulsating jets in the gap. These pulsating jets can help to clear debris from the spark gap, allowing machining to progress at greater speeds. Also, the vibratory movement of the electrode can help to reduce the occurrence of short-circuits between the electrode and the workpiece which can lead to electrode retraction and workpiece damage.

The method may have any one or, to the extent that they are compatible, any combination of the following optional features.

Usually, the electrode has an axial bore, i.e. the electrode can be tubular. The dielectric fluid can then be supplied in one direction through the bore and then flow over the outer surface of the electrode. For example, the fluid can exit the bore at an end of the electrode, and then return in the opposite direction over the outer surface of the electrode.

The electrode can be rotated about its long axis to reduce uneven electrode wear and to improve hole circularity.

The dielectric fluid may be supplied to the gap at a pressure of from 70 to 100 bar. High fluid pressures help to flush debris from the spark gap.

The dielectric fluid may be supplied to the gap at an electrical resistivity of from 2 to 17 MΩ·cm. The dielectric fluid can be deionised water.

The vibratory movement may have a frequency of up to 500 Hz, and preferably of up to 250 or 200 Hz. The vibratory movement may have a frequency of more than 50 Hz, and preferably of more than 80 Hz. The vibratory movement may have a frequency of about 100 Hz.

Preferably, the vibratory movement is sinusoidal.

Preferably, the electrode is displaced by a servo system (e.g. based on one or more linear induction motors, or one or more linear actuators such as piezo-electric actuators or pneumatic linear actuators combined with, for example, a lead-screw rotary motor) having a frequency response of at least 1 kHz and more preferably of at least 10, 50 or 100 kHz. Such devices can provide a high vibratory movement frequency. A further advantage of displacing the electrode using such a servo system is that its frequency response can be of a similar order of magnitude to the electrical discharge spark frequency (typically around 1-100 kHz) used in electrical discharge machining. Thus, the machining process can be made more responsive to fast changes in spark gap conditions, leading to a more stable and faster process. In contrast, many conventional electrical discharge machining systems are based on lead-screw servomotors which typically have maximum frequency responses of only about 30 Hz and are thus less capable of maintaining a constant spark gap.

The vibratory movement may have an amplitude of up to 200 microns, and preferably of up to 75 microns. The vibratory movement may have an amplitude of more than 20 microns. The vibratory movement may have an amplitude of about 50 microns.

In order that the vibratory movement and fluid jets can clear the debris efficiently from the spark gap, it is typically advantageous to erode the workpiece while maintaining a larger spark gap size than is usual during conventional electrical discharge machining. For example, for a displacement velocity of the electrode of less than 1.5 mm/sec, the spark gap voltage (which is typically used as a measure of the spark gap size) may be greater than 35V.

The step of flowing the dielectric fluid in the gap can include sending pulsating jets of the fluid to the gap. Such pulsating jets can further improve the rate of debris removal from the spark gap. Conveniently, the pulsating jets can have a pulse frequency which is the same as the frequency of the vibratory movement of the electrode. In the case of an electrode with an axial bore, the pulsating jets can be sent along the bore to the spark gap.

Any one or more of the rate of electrode displacement, the vibration amplitude, and the vibration frequency can be varied as the workpiece is eroded, e.g. as conditions at the spark gap change.

According to the method, a single electrode may be presented to the workpiece. Alternatively, a plurality of electrodes may be simultaneously presented to the workpiece.

A second aspect of the present invention provides an electrical discharge machining apparatus including:
an elongate electrode,
a drive mechanism which displaces the electrode relative to, in use, a workpiece, the displacement being in a direction aligned with the long axis of the electrode, and maintaining a spark gap between the electrode and the workpiece as the electrode wears and the workpiece is eroded by the electrode,
a dielectric source which produces a dielectric fluid flow in the gap, and
a vibration source which produces, simultaneously with the displacement, vibratory movement of the electrode, the vibratory movement being aligned with the long axis of the electrode.

Thus the apparatus is suitable for performing the method of the first aspect. Accordingly, the apparatus may have any one or, to the extent that they are compatible, any combination of the optional features corresponding to the optional features of the method of the first aspect. For example, the apparatus may have any one or, to the extent that they are compatible, any combination of the following optional features.

The electrode may have an axial bore, i.e. the electrode can be tubular.

The electrode can be rotated about its long axis.

The dielectric source may supply the dielectric fluid to the gap at a pressure of from 70 to 100 bar.

The vibration source can produce vibratory movement having a frequency of up to 500 Hz, and preferably of up to 250 or 200 Hz. The vibration source can produce vibratory movement having a frequency of more than 50 Hz, and preferably of more than 80 Hz. The vibration source can produce vibratory movement having a frequency of about 100 Hz.

Preferably, the drive mechanism and/or the vibration source has a frequency response of at least 1 kHz and more preferably of at least 10, 50 or 100 kHz.

The vibration source can produce vibratory movement having an amplitude of up to 200 microns, and preferably of up to 75 microns. The vibration source can produce vibratory movement having an amplitude of more than 20 microns. The vibration source can produce vibratory movement having an amplitude of about 50 microns.

Preferably, the vibration source produces a vibratory movement which is sinusoidal.

Conveniently, the apparatus can include one or more linear induction motors which provides both the drive mechanism and the vibration source, the linear induction motor being coupled to the electrode to displace the electrode relative to the workpiece, and to produce, simultaneously with the displacement, vibratory movement of the electrode. Advantageously, a linear induction motor can combine a high frequency response with high positional accuracy.

However, alternatively, the apparatus can include one or more linear actuators which provide the vibration source, the linear actuators being coupled to the electrode to produce the vibratory movement of the electrode. For example, the linear actuators can be piezo-electric actuators or pneumatic linear actuators. One option for such an arrangement is to operationally connect the one or more linear actuators to a reservoir for the dielectric fluid, such that, on activation of the actuators, pulsating jets of the fluid are sent from the reservoir to the spark gap simultaneously with the production of vibratory movement of the electrode. Conveniently, one or more linear actuators can be retrofitted to an existing electrical discharge machining apparatus to convert the apparatus into one according to the second aspect of the invention. The drive mechanism can include a lead-screw servomotor which is coupled to the electrode to displace the electrode relative to the workpiece. The one or more linear actuators may share with the servomotor the drive mechanism task of maintaining a spark gap between the electrode and the workpiece. For example, the linear actuators may displace the electrode up to a stroke limit of the actuators, whereupon the drive mechanism feeds the electrode to reset the actuators. This allows the apparatus to benefit from the high frequency response and high positional accuracy of a typical linear actuator. Thus, more generally, the one or more linear actuators may combine with a separate servomotor to provide the drive mechanism. Alternatively, the one or more linear actuators may be separate from the drive mechanism.

The apparatus may further include a tool holder which presents a single electrode. Alternatively, the apparatus may further include a tool holder which presents a plurality of electrodes to the workpiece.

In embodiments in which the dielectric source includes a reservoir for the dielectric fluid, the vibration source, on activation, can vibrate a piston that generates corresponding pressure pulses in the dielectric fluid of the reservoir, the axial bore of the electrode opening to the reservoir such that the pressure pulses produce the fluid jets. Conveniently, the electrode can then be connected to the piston such that the piston and electrode vibrate in unison. For example, when one or more linear actuators provide the vibration source, these can be connected to the piston by corresponding flexure joints. The connection to the piston can be direct, or indirect e.g. via a pressure cap and stopper arrangement. The electrode may enter the reservoir through an aperture in the cartridge, and preferably in the piston. The aperture may have a seal formation which grips the electrode and prevents leakage of dielectric fluid from the reservoir at the aperture. The seal formation may be configured such that its grip on the electrode is activated by the pressure of the dielectric fluid in the reservoir. For example, the seal formation may comprise a resilient body which is compressed (e.g. by the piston) into sealing engagement with the electrode under the action of the pressure of the dielectric fluid. When the apparatus includes a tool holder which presents a plurality of electrodes to the workpiece, the tool holder may include the piston (and the optional seal formation), which can then have a plurality of respective apertures for the electrodes. Indeed, more generally, the tool holder can take the form of a cartridge which also contains the reservoir. The piston is typically located at the lower end of the cartridge.

The apparatus may further include a computer-based control system for controlling the drive mechanism and the vibration source. The control system can be adapted such that any one or more of: the rate of the electrode displacement, the vibration amplitude, and the vibration frequency varies with electrode position. Typically, the apparatus further includes an electrical power supply which provides electrical power to the electrode, and a sensor which measures the spark gap. The control system can then also control the sparking frequency and the spark gap, and further can be adapted so that either of both of these parameters also varies with electrode position.

BRIEF DESCRIPTION OF THE DRAWINGS

Embodiments of the invention will now be described by way of example with reference to the accompanying drawings in which:

FIGS. 5(a) and (b) show schematically respectively front and side views of an HSEDM apparatus;

DETAILED DESCRIPTION

Figure 4A:
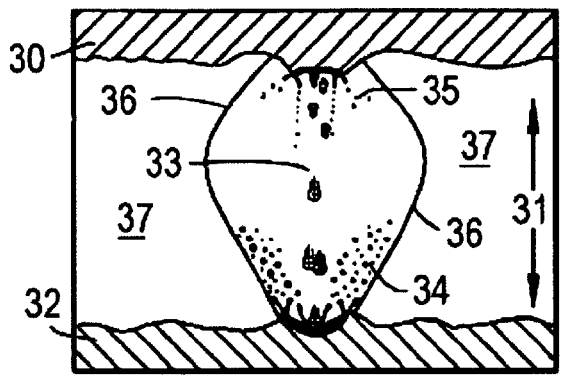
FIGS. 4(a) to (b) show schematically stages of the electrical discharge machining process with regard to erosion.
Figure 4B:
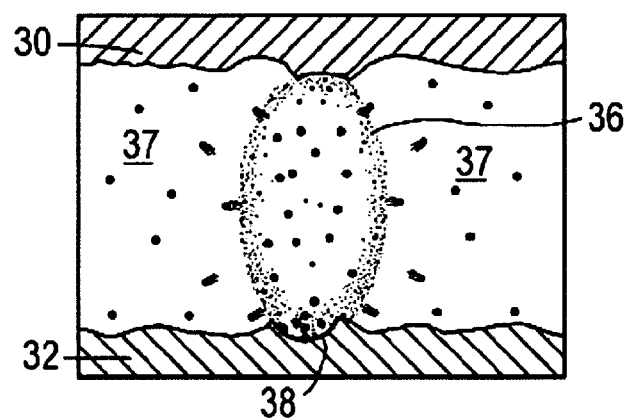

Removal of debris during HSEDM is important in order to achieve appropriate machining speeds and consistency. Debris is removed by the dielectric flushing out debris in the time between the sparks. This process is shown schematically in FIGS. 4(a) to (c). A gas bubble, illustrated in FIG. 4(a), is generated by high temperatures as a result of spark discharge. This gas bubble then implodes as illustrated in FIG. 4(b). The time between sparks, known as the "off time", should be sufficiently long to allow dielectric fluid flushing to remove the debris. The off time determines the overall drilling cycle time for electric discharge machining. Lack of adequate debris removal therefore results in increased cycle times. Furthermore, poor debris removal increases electrode wear in the form of tapering. In FIG. 4(a), as can be seen, an electrode 30 has a spark gap 31 to a workpiece surface 32. During electrical discharge a spark-induced plasma channel 33 creates debris 34 from the workpiece surface as well as releasing some electrode debris 35. Due to the heat of the spark, a bubble 36 is created within the high pressure dielectric fluid 37.

As illustrated in FIG. 4(b), during the off time the bubble 36 implodes, allowing the debris 34, 35 to enter into the dielectric fluid flow 37. During this off time, in addition to the debris, molten metal is partially removed from a spark generated crater 38. Any molten metal that is not removed solidifies and becomes what is known as a recast layer. Such recast layers can have detrimental effects in terms of surface modifications of the material from which the workpiece is formed.

Figure 4C:
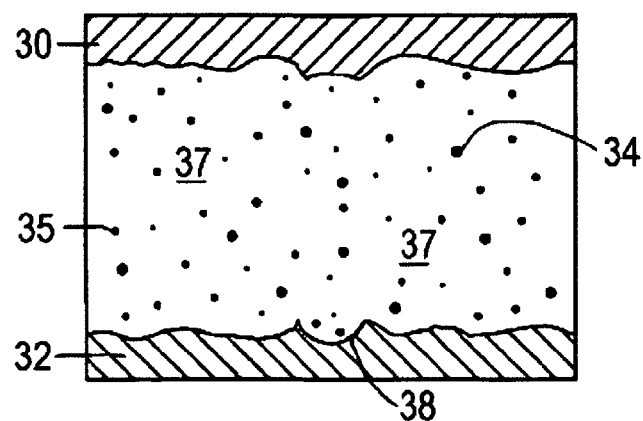

FIG. 4(c) illustrates the association between the workpiece 32 and the electrode 30 just prior to further electrical discharge machining. The debris 34, 35 is held in suspension within the dielectric 37 and is therefore flushed away under the relatively high pressure provided by HSEDM. Progressively craters 38 are formed across the surface of the workpiece in order to erode and drill as required.

However, interruptions caused by inadequate removal of debris and consequent short circuiting can limit HSEDM effectiveness.

FIGS. 5(a) and (b) show schematically respectively front and side views of an HSEDM apparatus. The tool holder 106 for the electrodes 108 has been omitted from the front view (a) so that other components of the apparatus can be visualised.

A linear induction servomotor 101 is coupled to a head carriage 103 by means of a motor rod 102. The head carriage is in turn mounted to a linear rail 115 (although in other embodiments, more than one linear rail may be used, or different types of linear guides can be employed, including linear air bearings). When the linear servomotor is activated, linear motion is thereby imposed on the head carriage.

Figure 1:
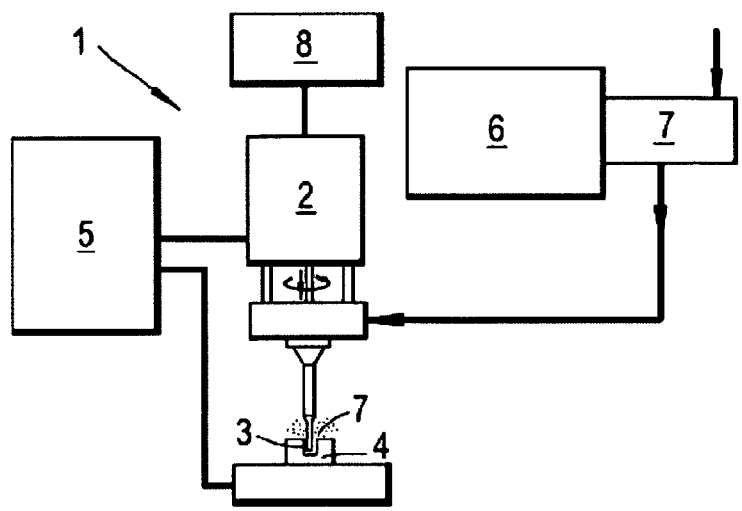
FIG. 1 schematically illustrates a typical HSEDM arrangement.
Figure 2A:
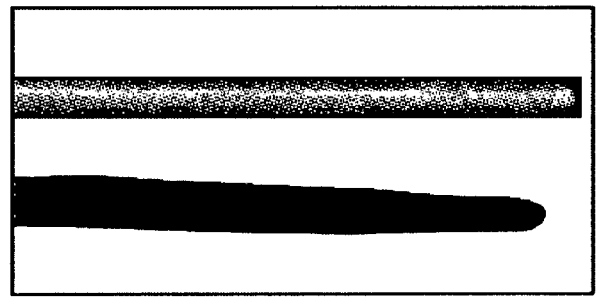
FIG. 2 shows (a) at top an unworn electrode and at bottom a worn, tapered electrode, and (b) a bank of differentially worn electrodes.
Figure 2B:
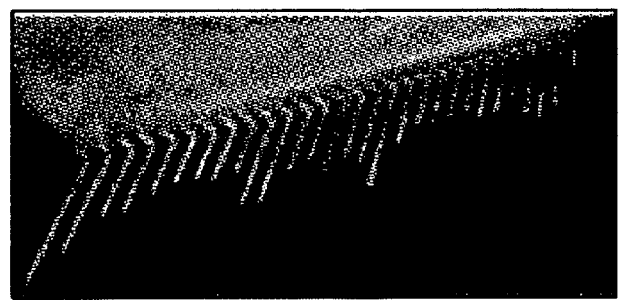
Figure 3:
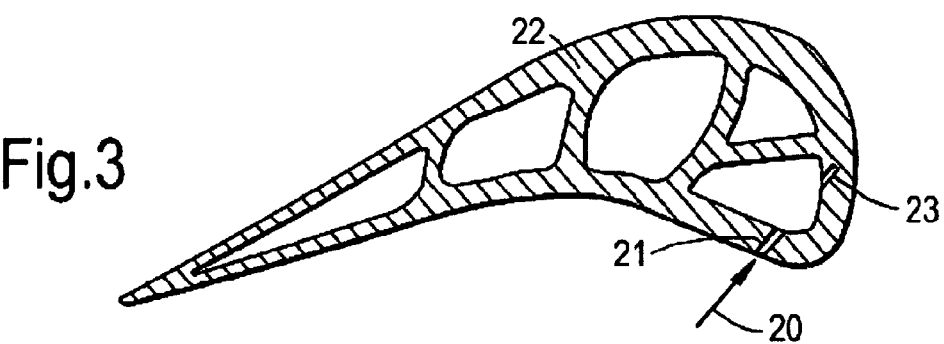
FIG. 3 shows a section through a turbine blade with undesirable backwall erosion.

An electrical connector 118 and a pneumatic chuck 104 are provided on the head carriage 103. The connector 118 is connected to an electrical power supply (omitted in FIGS. 2(a) and (b)) and transmits power across a mating connector 117 to a row of elongate tubular electrodes 108 mounted to a tool holder 106. The pneumatic chuck 104 holds the tool holder to the head carriage under an electric signal command.

The tool holder 106 has an electrode cartridge 105. A noseguide assembly 111 carrying a noseguide 110 is coupled to a static part 114 of the apparatus by means of a chuck 112. The electrodes 108 and high-pressure dielectric fluid are contained within the electrode cartridge. The electrodes pass under clamps 107, 109 and out through the noseguide. The clamp 107 is mounted beneath the electrode cartridge and consists of a bar, with a rubber pad, that is pneumatically applied to nip the electrodes during the drilling cycle. The clamp 109 is mounted on the noseguide assembly and consists of a bar, with rubber pad, that is pneumatically applied to nip the electrodes during the electrode reefed cycle.

Compressed air is supplied to clamps 107, 109 through respective connectors 116, 113. High-pressure dielectric fluid is fed to the electrode cartridge 105 and the noseguide 110 through respective connectors 119 and 120. Thus connectors 116, 119 are on the head carriage 103, while connectors 113, 120 are on the static part 114 of the apparatus. The tubular electrodes are bathed in dielectric fluid in a reservoir contained within the electrode cartridge 105 so that the dielectric can flow both through and outside the electrodes. A high-pressure (e.g. 70-100 bars) pump (omitted in FIGS. 2(a) and (b)) supplies dielectric fluid (e.g. deionised water) to the reservoir within the electrode cartridge 105 and thence to the machining spark gap between the electrodes and workpiece (e.g. blade) being drilled.

The linear induction servomotor 101 is capable of producing acceleration of up to 50 g in a mass of up to 10 Kg and can provide positional accuracy as small as 1 micron. In contrast to conventional rotary motors, linear induction motors convert electrical energy directly into linear movement, producing a straight-line force along the length of the motor. The linear servomotor is thus able simultaneously to displace the electrodes 108 in a direction aligned with their long axes to maintain the spark gap as the electrode wears and the workpiece is eroded, and to produce vibratory movement of the electrodes, the vibratory movement being aligned with the long axes of the electrodes.

Figure 6:
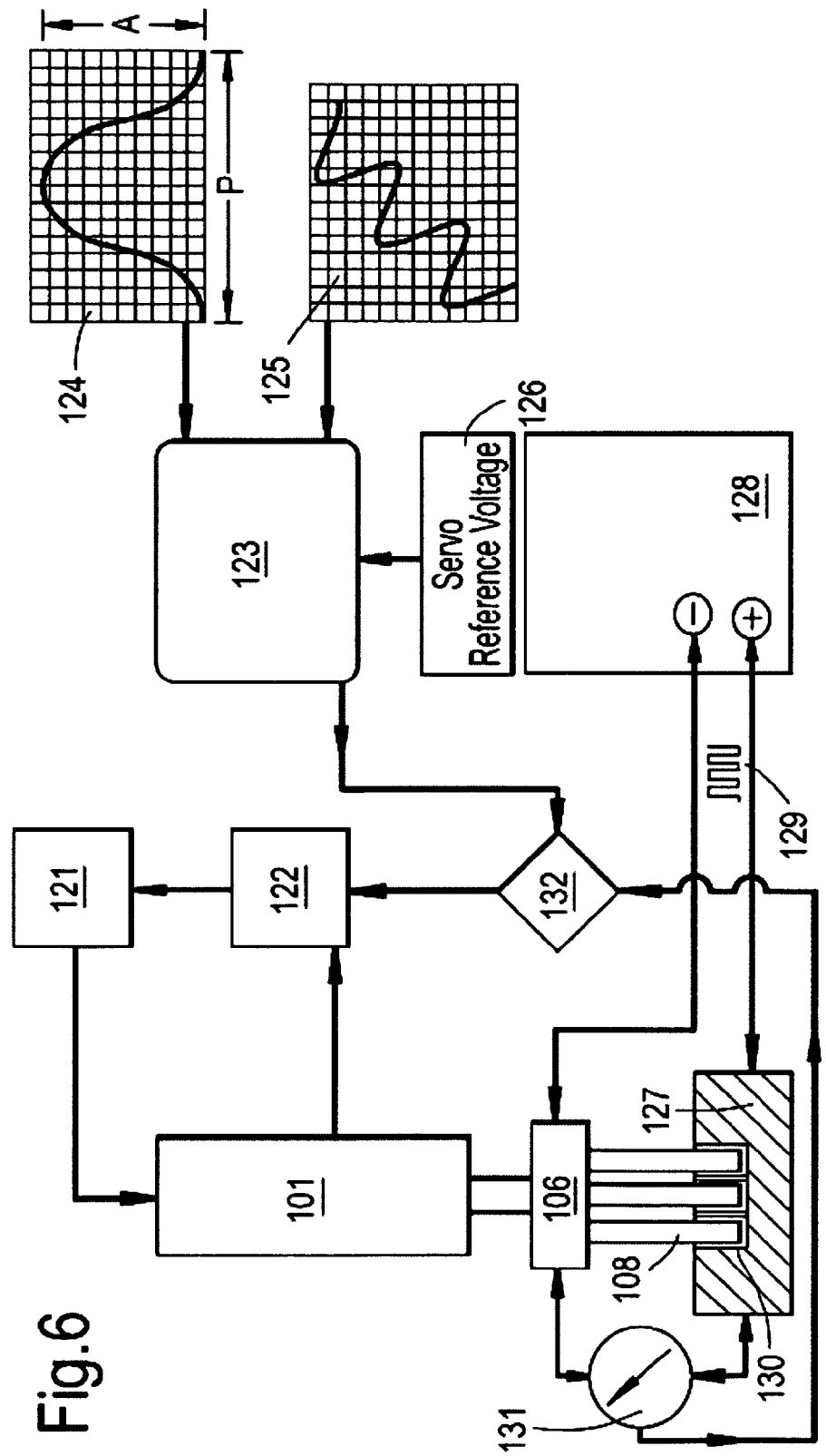
FIG. 6 shows schematically a spark gap control system for the apparatus of FIGS. 5(a) and (b)

A control system for the apparatus of FIGS. 5(a) and (b) is shown schematically in FIG. 6. The linear servomotor 101 is controlled by a drive 121, i.e. an electronic power amplifier that delivers the power required to operate the motor in response to low-level control signals supplied by a controller 122 which sets the motor motion parameters. A computer 123 is used to input the desired motion parameters including characteristics of a vibration sin wave 124 in terms of period (P) and amplitude (A), a displacement speed 125 (on which the sinusoidal vibration is superimposed) and a servo reference voltage 126. The small diameter tubular electrodes 108 and the workpiece 127 are connected to an electrical power supply 128, i.e. the EDM generator, which delivers periodic pulses of energy 129 to the spark gap 130.

As machining occurs (i.e. high frequency sparks remove material from both electrodes 108 and workpiece 127), the linear servomotor 101 displaces the tool holder 106 to which the electrodes are mounted at the displacement speed 125 to keep constant the spark gap 130 between electrodes and workpiece. A meter 131 continuously measures the mean gap voltage, which is compared with the servo reference voltage 126 by a numerical control (NC) unit 132. The tool holder 106 is moved downward if the mean gap voltage is higher than the reference voltage and upward when the mean gap voltage is lower than the reference voltage. The linear servomotor has a frequency response in excess of 1000 Hz, i.e. due to the dynamic characteristics of the linear servomotor and its control system, the servomotor can respond to changes in the spark gap within 0.001 sec.

Key process variables (such as frequency and amplitude of vibration, speed of displacement and EDM generator parameters) can be varied during the drilling process according to the depth of holes being drilled. This variation may be controlled by a program executed by the computer 123, together with the NC unit 132. An alternative approach that can be used to change key process variables during the drilling process is to use sensors to measure spark gap conditions in a closed-loop system e.g. combined with artificial intelligence techniques such as neural network or fuzzy logics. Such an approach could facilitate dynamic optimisation of the process variables.

The linear servomotor 101 can induce vibrations in the electrodes of up to 200 Hz with peak to peak amplitudes of up to 100 microns, and a resolution smaller than 0.1 microns. These vibrations induce corresponding vibrations in the dielectric fluid which can improve removal of debris from the spark gap. Furthermore, the servomotor positional accuracy of 1 micron facilitates accurate control of the spark. In addition, the high frequency vibration creates gaps between the electrode surfaces and the walls of the drilled hole which minimise the occurrence of arcing.

More specifically, cooling holes in turbine blades can have diameters as small as 0.38 mm and length-to-diameterratios of up to 80:1. The diameter of an electrode employed to drill 0.38 mm holes is usually 0.33 mm. If there is a requirement to drill a hole with diameter of 0.38 mm and length of 30 mm, the distance from the tip of the electrode to the noseguide will be 30 mm at hole breakthrough. Such a slender electrode can tend to tilt and touch the sidewall of the hole during the drilling process, provoking short-circuits and process interruption. Another problem associated with the drilling of deep holes with small diameters is the removal of debris from the spark gap. This can be difficult even when high-pressure dielectric fluid (of up to 100 bars) is employed. The accumulation of debris can provoke arcing and increase cycle times. These problems become more critical when multi-electrode drilling operations are carried out, as the apparatus has just one servomotor to control a plurality of spark gaps.

FIG. 7 show respective schematic cross-sections (a) to (d) of workpieces 205 and tubular electrodes 202 during HSEDM drilling. The workpieces are drilled using multi-electrode tools 203 and high-pressure (70 to 100 bars) dielectric fluid 201 supplied to the bore of the electrodes from the electrode cartridge (omitted). High frequency sparks 207, in the order of 100 kHz, promote material removal both from electrodes and especially from the workpieces.

Figure 7A:
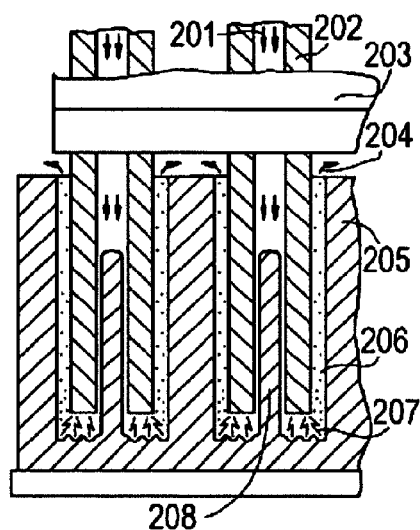
FIG. 7 show respective schematic cross-sections (a) to (d) of workpieces and tubular electrodes during HSEDM drilling, cross-sections (a) and (c) being without vibratory movement being applied to the electrodes, and cross-sections (b) and (d) being with vibratory movement being applied to the electrodes.
Figure 7B:
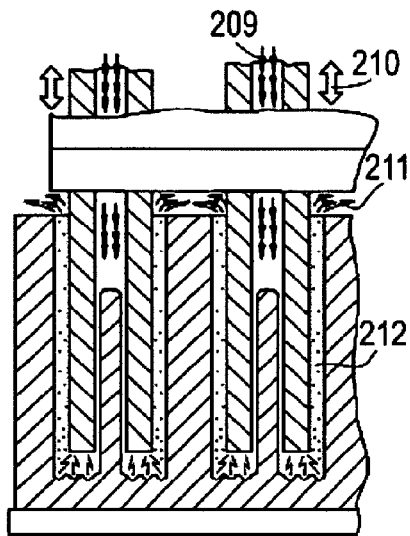

FIG. 7(a) is an example of the process without vibratory movement being applied to the electrodes 202. The resultant debris 206 from the process tends to accumulate in the spark gap and in the lower end of the holes as the dielectric pressure is insufficient to flush the debris out in the exiting flow 204. The accumulation of debris can result in arcing, which damages the workpiece and increases cycle times. However, when axially aligned vibrations 210 are applied to the electrodes, as shown in FIG. 7(b), the oscillating electrodes and holes being drilled act like reciprocating pumps in which the electrodes are the pistons and holes are the cylinders. The vibratory movement of the electrodes at a frequency of up to 500 Hz and peak to peak amplitude of up to 100 microns pumps the dielectric fluid 212 and debris out of the spark gap and the holes. Thus the pumping action improves flushing 211, and can be increased further when the vibrations are combined with pulsating jets 209 of dielectric fluid sent to the spark gap through the axial bore of the electrode, the jet pulsations along the bore of the electrode having the same frequency as the electrode vibratory movement. An HSEDM apparatus which produces such synchronised pulsating jets is described below in relation to FIGS. 10 to 12.

Figure 7C:
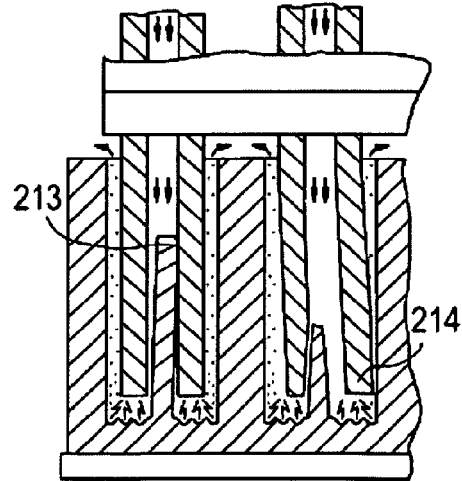
Figure 7D:
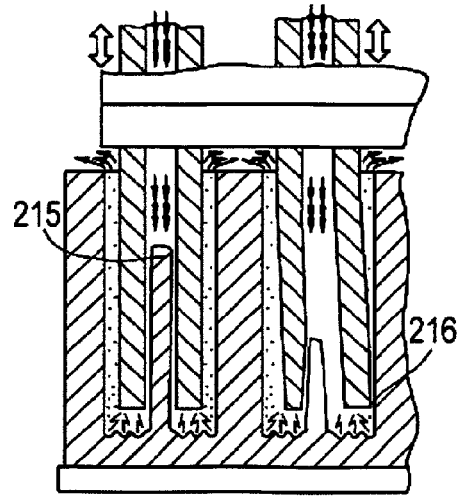

FIG. 7(c) is another example of the process without vibratory movement being applied to the electrodes 202. The tubular electrodes 202 tend to form cores 208 of workpiece material that remain uncut in the centres of the holes being drilled. Such a core may tilt and touch 213 the internal wall of the electrode, provoking short-circuits. In addition, the slender electrodes can move sideways 214 and touch the sidewall of the holes being drilled, again provoking short-circuits. Such short-circuits cause servo retraction and consequently lead to longer machining times or to process interruptions. Moreover, the short-circuits can damage the workpiece. However, when axially aligned vibrations 210 are applied to the electrodes, as shown in FIG. 7(d), small gaps 215, 216 can be more easily maintained between the cores and electrode bore, and between the electrode outer surface and the hole sidewall. These gaps result from damage caused by the vibrations to the roughness asperities on the surfaces of the electrodes and the workpiece, the asperities being the channels for electrical current flow between the electrodes and the workpiece.

Thus the vibration of the electrodes improves flushing and reduces short-circuits, and, as a result, the servomotor can move downwards at faster speeds.

Drilling trials were carried out using a multi-electrode tool with capacity to hold 18 tubular electrodes. The diameter of the electrodes was 0.31 mm and these were used to cut (in a single pass) 18 holes with a length of 4 mm. A Design of Experiments fractional factorial approach was used to perform the experiments and analyse the results. The factors used in the design are shown in the table below. The factor "Vibration" refers to the vibration produced in the electrode. The lower level (−1) of vibrations means that tests were carried out without vibrations, whereas the higher level (+1) means that the tests were carried out with vibrations. "Servomotor Speed" refers to the velocity with which the servomotor advances to keep the spark gap constant. "Gap Voltage" refers to the reference voltage, which is proportional to the spark gap size, i.e. a Gap Voltage at the higher level means that the size of the spark gap is higher than at the lower level.

| FACTOR | LEVEL | |
| --- | --- | --- |
| | I | II |
| Vibration | −1 | +1 |
| Servomotor Speed | −1 | +1 |
| Gap Voltage | −1 | +1 |

Figure 8A:
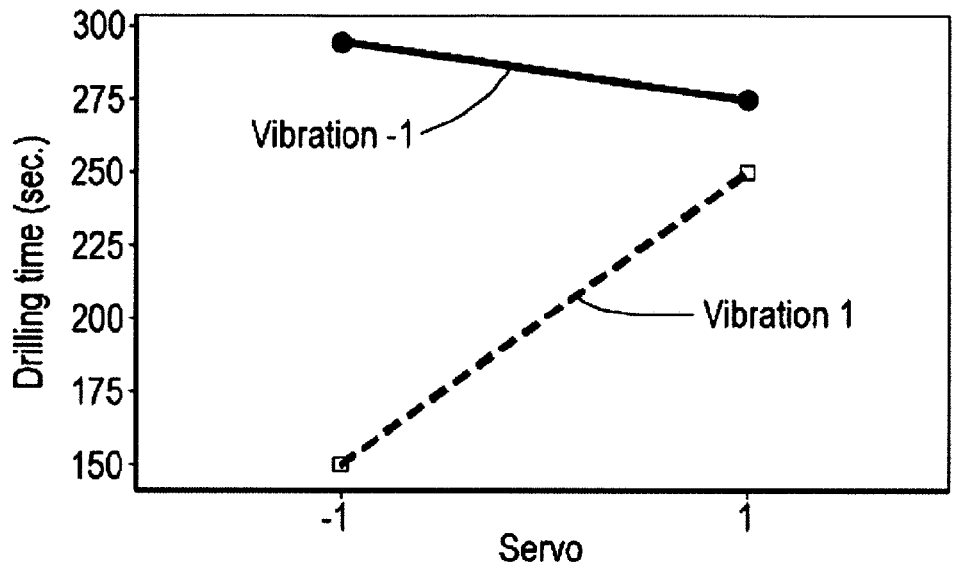
FIG. 8 shows respective Design of Experiment interaction plots for drilling speed plotted against (a) Servomotor Speed and (b) Gap Voltage, in both cases with or without vibrations.
Figure 8B:
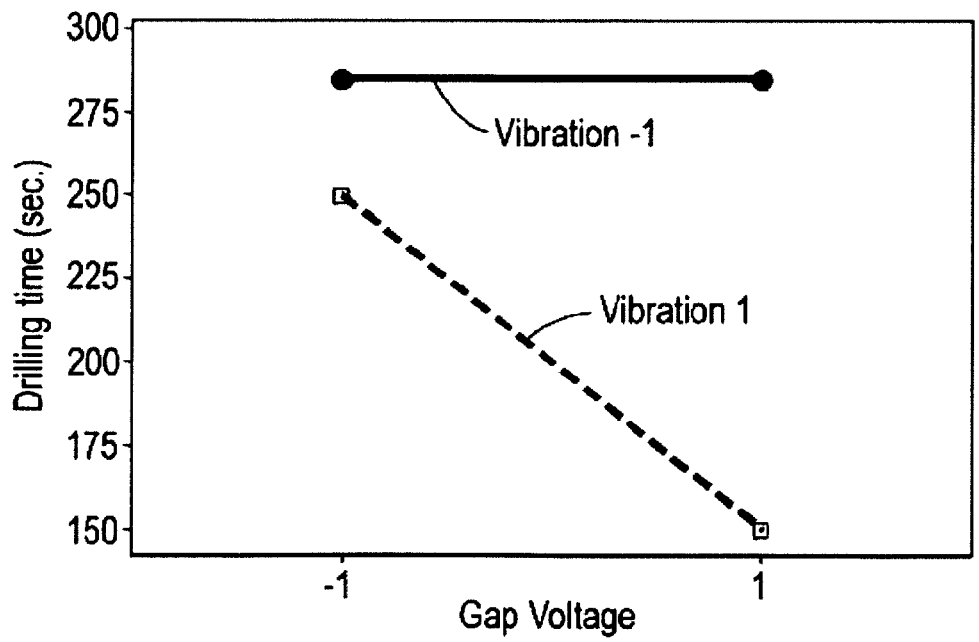

FIGS. 8(a) and (b) show interaction plots of the experimental parameters, i.e. drilling speed plotted again (a) Servomotor Speed and (b) Gap Voltage for the different vibration levels. When vibrations are produced in the electrodes (dotted lines), smaller cycle times are achieved with the servomotor speed at the lower level. In contrast, the higher servo speed decreased the cycle time when the vibrations were turned off. As to gap voltage, when trials were carried out without vibrations, changing the value of the gap voltage did not affect cycle times. In contrast, gap voltage had to be set at the higher level in order to reduce cycle times with electrode vibrations. When vibrations are applied to the electrodes, a higher spark gap size helps the electrode oscillations to remove debris from the spark gap.

Figure 9:
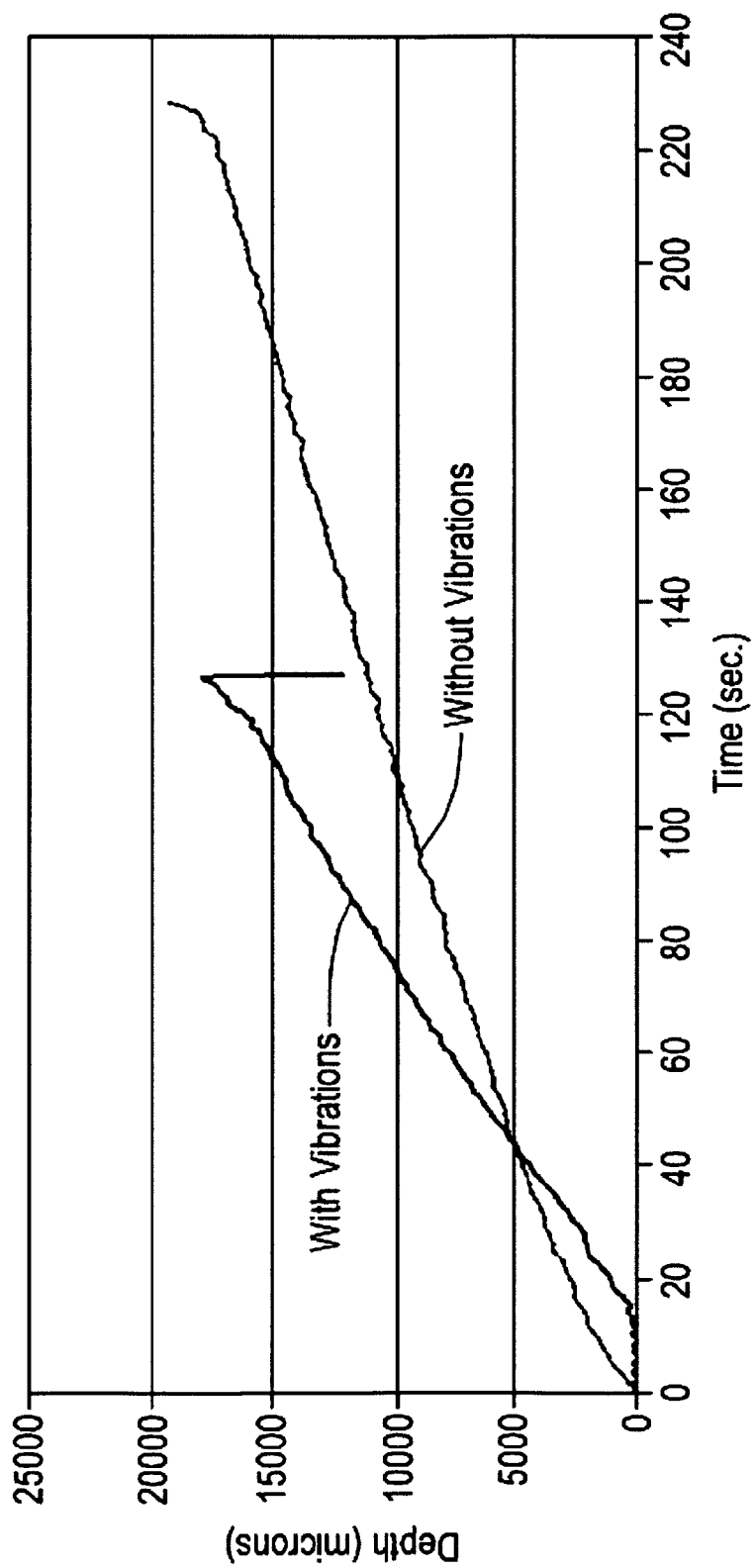
FIG. 9 shows typical plots of drilling depth against time obtained with and without vibratory movement being applied to an electrode.

FIG. 9 shows typical plots of drilling depth against time obtained with and without vibrations. Reductions in cycle times of nearly 50% can be achieved if vibrations are applied to the electrodes.

Figure 10A:
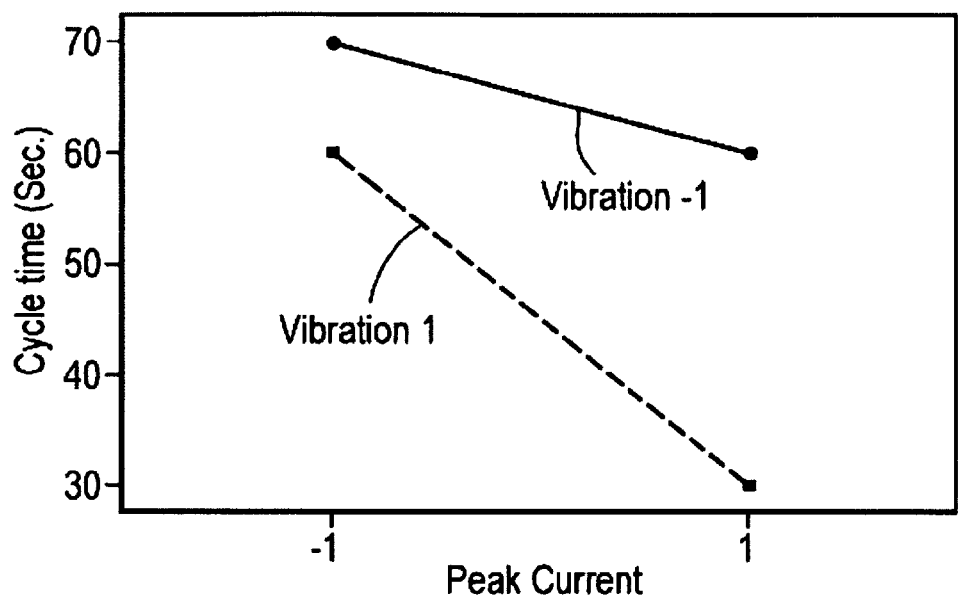
FIG. 10 shows respective Design of Experiment interaction plots for cycle time plotted against (a) peak current, and (b) duty cycle, in both cases with or without vibrations.
Figure 11A:
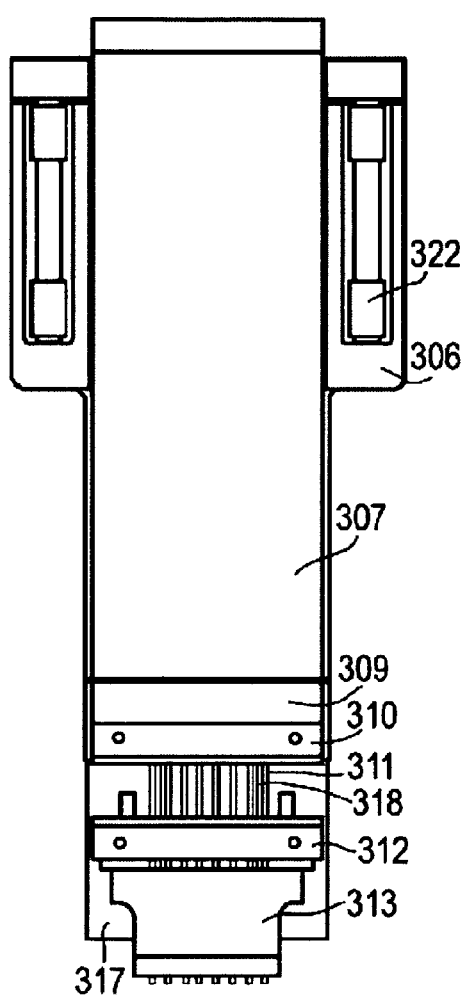
FIGS. 11(a) and (b) show schematically respectively front and side views of another HSEDM apparatus.

Further drilling trials were carried out to produce additional interaction plots. FIG. 10(a) shows plots of cycle time (i.e. time to drill a given hole depth) against peak current (+1=high peak current, −1=low peak current) for tests carried out with (+1) or without (−1) vibrations.

Figure 10B:
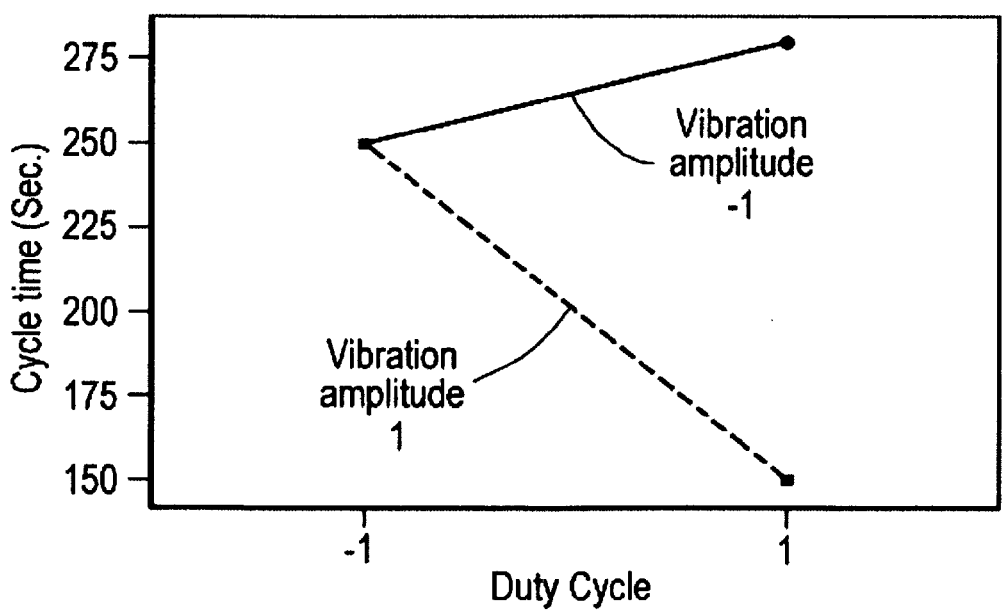

HSEDM drilling assisted by vibrations is faster when compared with drilling that is not assisted by vibrations. However, the impact of vibrations is more significant when higher levels of peak current are employed. FIG. 10(b) shows plots of cycle time against duty cycle (+1=high duty cycle, −1=low duty cycle) for tests carried out with (+1) or without (−1) vibrations, duty cycle being the ratio of the sparking time to the length of time required for one complete sparking cycle (i.e. the time for sparking to take place and then for implosion of the gas bubble and removal of debris before the next sparking event). The impact of vibration becomes very significant for high levels of duty cycle, but is negligible at low levels of duty cycle.

The HSEDM apparatus described with reference to FIGS. 5(a) and (b) has a linear induction servomotor which both displaces the electrodes to maintain the spark gap and produces the vibratory movement of the electrodes. However, other configurations are possible, e.g. in which the displacement and vibration functions are driven by different parts of the apparatus. For example, FIGS. 11(a) and (b) shows schematically respectively front and side views of an HSEDM apparatus in which a lead-screw servomotor drives the electrode displacement and separate piezo-electric or pneumatic linear actuators drive the electrode vibration. The servomotor 301 has a coupling 302 to a lead-screw 303 that turns the servo rotation into linear motion of a head carriage 304.

An electrical connector 321 and a pneumatic chuck 305 are provided on the head carriage 304. The electrical connector is connected to an electrical power supply (omitted in FIGS. 11(a) and (b)) and transmits power across a mating connector 320 to tubular electrodes 311 mounted to a tool holder 308. The pneumatic chuck holds the tool holder to the head carriage under an electric signal command.

The tool holder 308 has an electrode cartridge 307. A noseguide assembly 314 carrying a static noseguide 313 is coupled to a static part 317 of the apparatus by means of a chuck 315. The electrodes 311 and high-pressure dielectric fluid are contained within the electrode cartridge. The electrodes pass under clamps 310, 312 and out through the noseguide. The clamp 310 is mounted beneath the electrode cartridge and consists of a bar, with rubber pad, that is pneumatically applied to nip the electrodes during the drilling cycle. The clamp 312 is mounted on the noseguide assembly and consists of a bar, with rubber pad, that is pneumatically applied to nip the electrodes during the electrode reefed cycle.

Compressed air is supplied to clamps 310, 312 through connectors 319, 316. High-pressure dielectric fluid is fed to the electrode cartridge 307 and the noseguide 313 through connectors omitted in FIGS. 11(a) and (b).

Figure 12A:
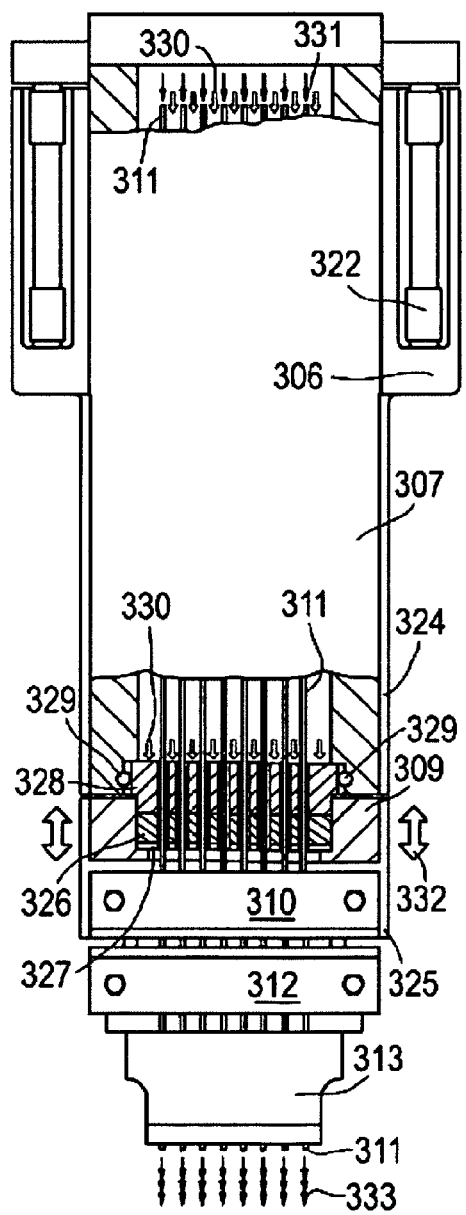
FIG. 12 shows schematically front views of respectively (a) the tool holder and (b) the vibration plate of the apparatus of FIGS. 11(a) and (b)
Figure 12B:
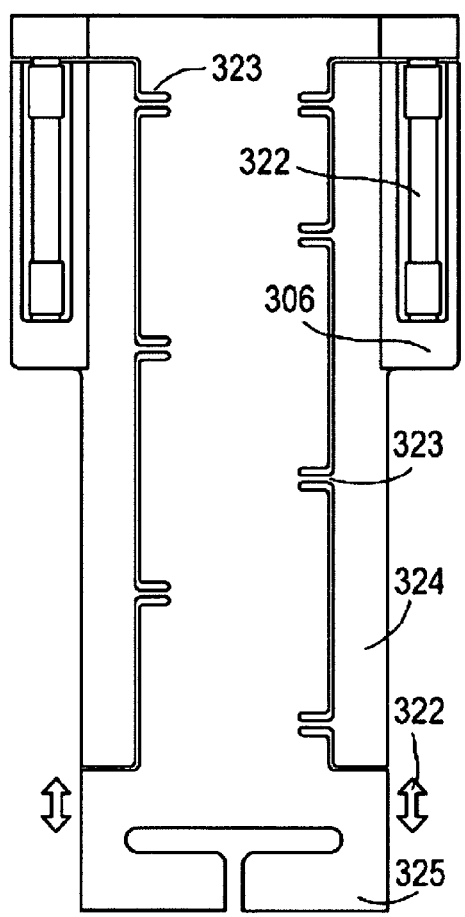

Two linear actuators 322 are assembled in a vibration plate 306 mounted to the tool holder 308 (in other embodiments only one linear actuator, or more than two linear actuators can be employed). FIG. 12 shows schematically front views of respectively (a) the tool holder and (b) the vibration plate. The vibration plate has flexure joints 323. The electrode cartridge 307 is attached to a static section 324 of the vibration plate, while a pressure cap 309 and the clamp 310 are attached to a moving section 325 of the vibration plate. The pressure cap contains a rubber seal 326 and a plastic stopper 327. A piston 328 is mounted at the lower end of the electrode cartridge above the seal and the stopper, with a seal ring 329 fluidly sealing the piston to the static section of the vibration plate. The piston, the seal and the stopper contain matching rows of holes through which the electrodes 311 are passed.

Figure 13:
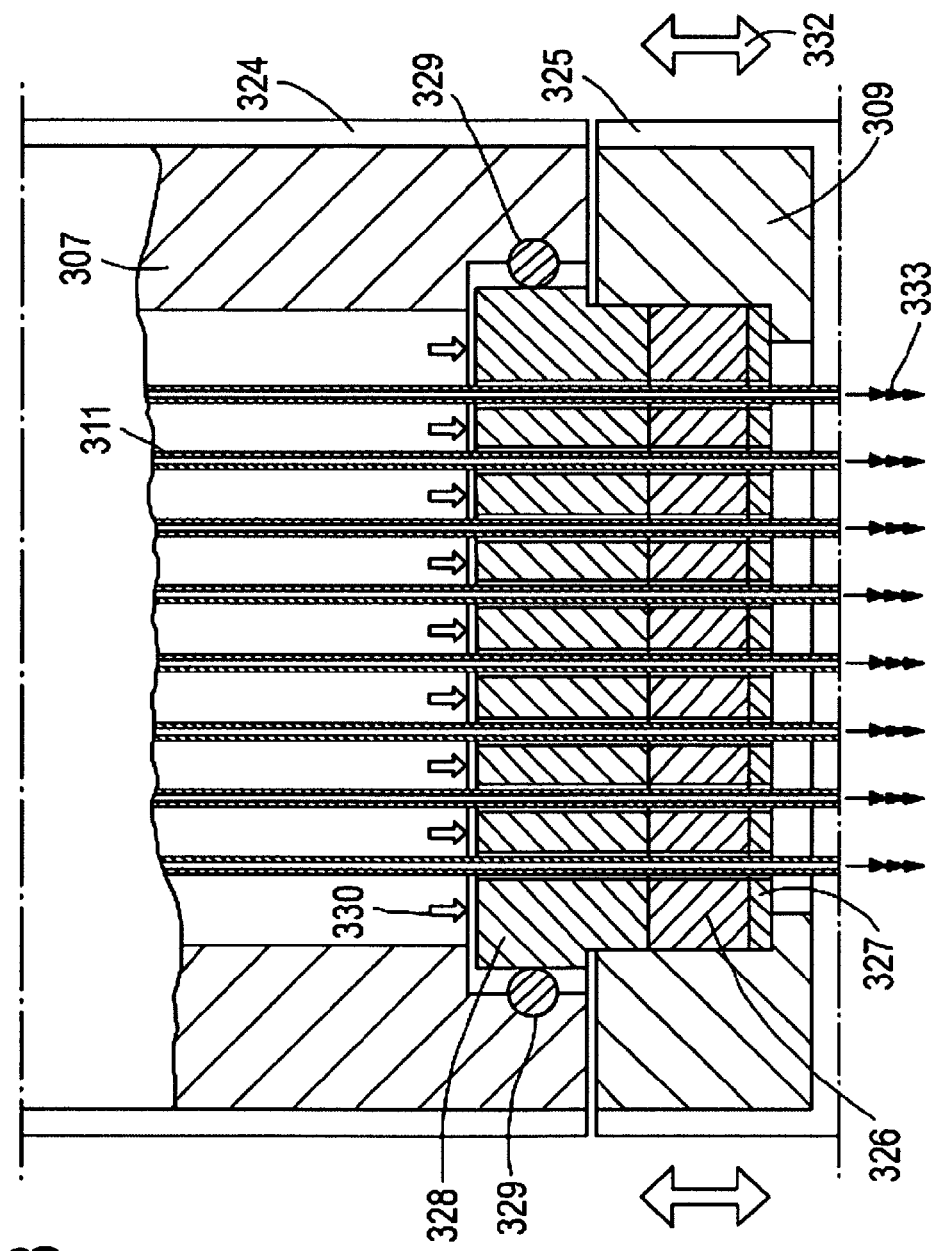
FIG. 13 shows schematically a close-up front view of the lower end of the electrode cartridge and the pressure cap of the apparatus of FIGS. 11(a) and (b).

FIG. 13 shows schematically a close-up front view of the lower end of the electrode cartridge 307 and the pressure cap 309. Just before the start of the drilling process the electrodes 311 are clamped by the clamp 310 and dielectric fluid 330 at a pressure ranging from 70 to 100 bars is supplied to a fluid reservoir defined within the electrode cartridge. The high-pressure fluid in the reservoir provokes a movement of the piston 328, which squeezes the seal 326 against the stopper 327. As a result, the holes in the seal reduce in size, gripping the electrodes and sealing the electrode cartridge. A flow 331 of dielectric is supplied to the spark gaps through the bores of the electrodes and through flushing holes (omitted from FIGS. 11 to 13) in the noseguide.

The linear actuators 322 produce oscillations 332 in the moving section 325 of the vibration plate 306, where the pressure cap 309 and clamp 310 are mounted. The movement of the vibration plate induces vibrations (with frequencies of up to 500 Hz and peak-to peak amplitude up to 100 microns) in the electrodes 311. Moreover, the oscillations of the pressure cap 309 induce pressure pulses in the dielectric fluid 330 contained in the reservoir of the electrode cartridge 307. These pressure pulses produce high frequency pulsating jets 333 of dielectric fluid that are supplied to the spark gaps via the bores of the electrodes. Advantageously, the combined effects of the pumping action provided by electrode oscillations and the high frequency pulses of the dielectric jets greatly improve the flushing of debris from the spark gaps. Furthermore, the use of separate linear actuators to drive the electrode vibration facilitates the retrofitting of such actuators onto existing HSEDM apparatuses.

A disadvantage of lead-screw servomotors is their typically low frequency response of about 30 Hz, which is not fast enough to respond to rapid changes to the spark gap. It is possible to increase the frequency response of lead-screw servos by increasing the pitch and/or rotational speed. However, this affects the positional resolution of the electrodes. Moreover, too high rotational speeds can cause the screw to whip or hit a resonant frequency causing uncontrolled vibrations and wild instability. However, by retrofitting a lead-screw servomotor with one or more linear actuators to drive electrode vibrations, the low frequency response can be side-stepped such that the retrofitted apparatus can be made to provide high frequency vibratory movement of the electrodes simultaneously with their displacement to maintain the spark gap. Also the dielectric fluid can be made to issue from the bores of the electrodes into the spark gaps as pulsed jets synchronised with the electrode vibration to further enhance debris removal.

However, if screw resonance and whip can be avoided, by using e.g. appropriate software it is nonetheless possible to control a lead-screw servomotor to produce electrode vibrations superimposed on the linear motion of the electrodes without the use of additional linear actuators. Although the response time of such an arrangement will be relatively low, some benefits can be obtained, such as the ability to produce pulsating jets of dielectric fluid and improved removal of debris through a dielectric fluid pumping action.

Figure 11B:
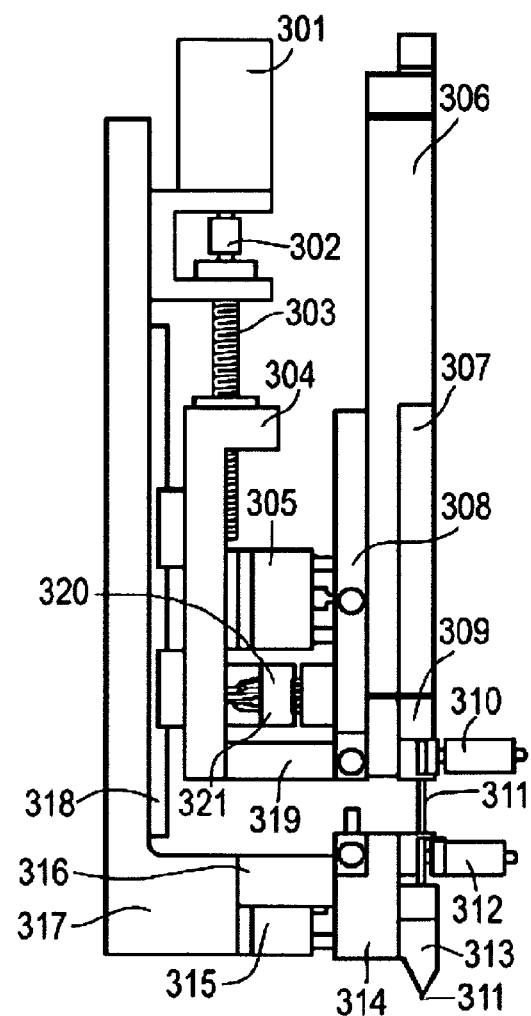

The apparatus of FIGS. 11 to 13 can be controlled by the control system shown in FIG. 6.

In an operational variant, the task of keeping constant the size of the spark gap can be shared between the linear actuators 322 and the lead-screw servomotor 301. More specifically, the linear actuators provide high positional precision and a high frequency response, but only allow a maximum stroke about 200 microns. Thus, as well as vibrating the electrodes 311, the actuators can be used to displace the electrodes to keep the spark gap constant up to the stroke limit of the actuators, whereupon the lead-screw servomotor re-feeds the electrodes. Indeed, a variant apparatus can have one or more linear actuators to provide electrode vibration and displacement, and a linear induction servomotor instead of a lead-screw servomotor to re-feed the electrodes.

While the invention has been described in conjunction with the exemplary embodiments described above, many equivalent modifications and variations will be apparent to those skilled in the art when given this disclosure. For example, an apparatus can have just one electrode. Another type of electrode tool holder can produce electrode rotation during the drilling process. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A method for electrical discharge machining a workpiece including the steps of:
presenting an elongate electrode to the workpiece with a spark gap therebetween, the electrode having an axial bore,
flowing a dielectric fluid through the bore and into the gap,
eroding the workpiece by electrical discharge between the tip of the electrode and the workpiece,
displacing the electrode in a direction aligned with the long axis of the electrode to maintain the gap as the electrode wears and the workpiece is eroded, and
simultaneously with the displacement, producing vibratory movement of the electrode, the vibratory movement being aligned with the long axis of the electrode;
wherein the vibratory movement of the electrodes causes pulsating jets of fluid which are sent along the bore to the gap, the pulsating jets having a pulse frequency which is the same as the frequency of the vibratory movement of the electrode.

2. A method according to claim 1, wherein the vibratory movement has a frequency of up to 500 Hz.

3. A method according to claim 1, wherein the vibratory movement has an amplitude of up to 200 microns.

4. A method according to claim 1, wherein the dielectric source supplies the dielectric fluid to the gap at a pressure of from 70 to 100 bar.

5. A method according to claim 1, wherein a plurality of the electrodes are simultaneously presented to the workpiece.

6. A method as claimed in claim 1, wherein the dielectric has a resistivity of between 2 to 17 MΩ. cm.

7. An electrical discharge machining apparatus including:
an elongate electrode having an axial bore,
a drive mechanism which displaces the electrode relative to, in use, a workpiece, the displacement being in a direction aligned with the long axis of the electrode, and maintaining a spark gap between the electrode and the workpiece as the electrode wears and the workpiece is eroded by the electrode,
a dielectric source which flows a dielectric fluid into the gap along the bore, and
a vibration source which produces, simultaneously with the displacement, vibratory movement of the electrode, the vibratory movement being aligned with the long axis of the electrode;
wherein the dielectric source includes a reservoir for the dielectric fluid, and the vibration source is operationally connected to the reservoir, such that, on activation of the vibration source, pulsating jets of the fluid are sent from the reservoir, along the bore and to the gap simultaneously with the production of vibratory movement of the electrode.

8. An apparatus according to claim 7, wherein the vibration source produces vibratory movement having a frequency of up to 500 Hz and the dielectric source supplies the dielectric fluid to the gap at a pressure of from 70 to 100 bar.

9. An apparatus according to claim 7, further including a tool holder which presents a plurality of the electrodes to the workpiece.

10. An apparatus according to claim 7, wherein the electrode enters the reservoir through an aperture having a seal formation which grips the electrode to prevent leakage of dielectric fluid from the reservoir at the aperture, the seal formation being configured such that its grip on the electrode is activated by the pressure of the dielectric fluid in the reservoir.

11. An apparatus according to claim 7, wherein the vibration source, on activation, vibrates a piston that generates corresponding pressure pulses in the dielectric fluid of the reservoir, the axial bore of the electrode opening to the reservoir such that the pressure pulses produce the fluid jets.

12. An apparatus according to claim 11, wherein the electrode is connected to the piston such that the piston and electrode vibrate in unison.

13. An apparatus according to claim 11, wherein the electrode enters the reservoir through an aperture in the piston.

14. An apparatus according to claim 11, wherein the electrode enters the reservoir through an aperture in the piston.

15. An apparatus according to claim 7 including one or more linear induction motors which provides both the drive mechanism and the vibration source, the linear induction motors being coupled to the electrode to displace the electrode relative to the workpiece, and to produce, simultaneously with the displacement, vibratory movement of the electrode.

16. An apparatus according to claim 7 including one or more linear actuators which provide the vibration source and which combine with a separate servomotor to provide the drive mechanism, the linear actuators being coupled to the electrode to produce the vibratory movement of the electrode.

* * * * *